UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

BLUE-BLACK AZO DYE.

SPECIFICATION forming part of Letters Patent No. 608,999, dated August 16, 1898.

Application filed January 21, 1893. Serial No. 459,086. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, JOHANN BAMMANN and MORITZ ULRICH, doctors of philosophy, chemists, (assignors to the FARBENFABRIKEN, VORMALS FR. BAYER & CO., of Elberfeld,) subjects of the Emperor of Germany, residing at Elberfeld, Germany, have invented a new and useful Improvement in the Manufacture of Blue Substantive Coloring-Matters, (for which the aforesaid Farbenfabriken have already obtained Letters Patents in the following countries: in England, No. 13,443, dated August 26, 1890; in France, No. 210,033, dated December 6, 1890; in Italy, XXV, No. 29,631, and LVIII, No. 100, dated April 27, 1891, and in Austria-Hungary, No. 35,494 and No. 58,417, dated November 28, 1890,) of which the following is a specification.

Our invention relates to the production of a new violet-black mixed tetrazo coloring-matter by combining one molecular proportion of a tetrazo-diphenyl salt first with one molecular proportion of amidonaphtholdisulfo-acid or an alkaline salt thereof and then with one molecular proportion of alpha-naphthylamin or, inversely, by combining one molecular proportion of a tetrazo-diphenyl salt first with one molecular proportion of alpha-naphthylamin and then with one molecular proportion of amidonaphtholdisulfo-acid or a salt thereof.

By "amidonaphtholdisulfo-acid" we understand that alphaämido-alpha-naphthol-beta-disulfo-acid which we have described in a separate specification and which was first produced by us—viz., by melting with caustic alkalies, most practically at from 180° to 190° centigrade, the alpha-naphthylamintrisulfo-acid which is derived from the naphthalene-trisulfo-acid of Gürke and Rudolph and which was first prepared by Koch by nitrating the said naphthalenetrisulfo-acid and reducing the alpha-mononitro-naphthalenetrisulfo-acid thus formed. This amidonaphtholdisulfo-acid, usually termed "1.8 amidonaphthol-beta-disulfo-acid," is identical with the amidonaphtholdisulfo-acid H, which has been obtained afterward by converting naphthalene 2.7 disulfo-acid into its dinitro compound, reducing the latter and heating the diamido-naphthalene-alpha-disulfo-acid thus formed with diluted acids, as mentioned in the specification forming part of Letters Patent to Meinhard Hoffmann, No. 464,135, dated December 1, 1891.

In carrying out our process practically we proceed as follows: A solution in water of 3.63 kilos, by weight, of the sodium salt of the 1.8 amidonaphthol-beta-disulfo-acid hereinbefore specified is allowed to flow into a solution of tetrazo-diphenyl chlorid obtained from 1.84 kilos, by weight, of benzidin or the corresponding quantity of a benzidin salt by means of 1.4 kilos, by weight, of sodium nitrite in hydrochloric solution. The resulting solution is rendered and kept moderately alkaline by the addition of sodium carbonate or the like or is rendered weakly acid by means of acetic acid. After some hours the formation of the intermediate product is complete. The latter is filtered off and introduced into a watery solution prepared by dissolving 1.8 kilos, by weight, of alpha-naphthylamin hydrochlorate and adding about 1.64 kilos, by weight, of sodium acetate.

Of course it is not necessary to filter off the intermediate product, but the mixture containing the same may directly be added to the acetic solution of alpha-naphthylamin.

After about twelve hours the mixture is heated for a short time at about 50° centigrade in order to complete the reaction. After rendering alkaline the complete dyestuff is isolated in the usual way—viz., by salting out, filtering off, pressing, and drying.

The same coloring-matter results if one molecular proportion of tetrazo-diphenyl salt is coupled first with one molecular proportion of alpha-naphthylamin in moderately-acid solution, and the thus-formed intermediate product is then combined with one molecular proportion of the above-said 1.8 amidonaphthol-beta-disulfo-acid, most practically in moderately-alkaline solution.

In place of the sodium salt of amidonaphtholdisulfo-acid the corresponding quantities of other alkaline salts of the said acid or of the free acid can be employed.

Our new coloring-matter having the formula

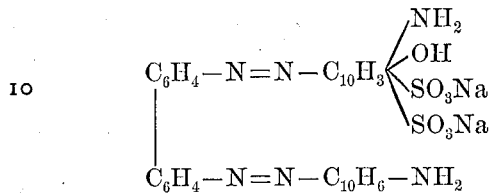

forms, after drying and pulverizing, a brownish-black powder assuming metallic luster on grinding. It is soluble in water with bluish-red color and dissolves with the same color in alcohol. In ammonia it dissolves with brightly bluish-red color, which is somewhat redder than is the color resulting by dissolving the product in water. It is little soluble in sodium carbonate at ordinary temperature more readily on heating with dull bluish-red color. On cooling brownish-black flakes are separated from the solution in sodium carbonate. In soda-lye it is almost insoluble at ordinary temperature, while it is dissolved more readily on heating with dull bluish-red color. It is almost insoluble in diluted hydrochloric or sulfuric acid even on heating. On adding ammonia to its watery solutions the color becomes somewhat redder, and after some time a precipitate is separated. When its solutions in water are mixed with sodium carbonate or soda-lye, the color becomes brownish red, while the addition of sodium carbonate or soda-lye in excess produces a precipitation of dark brownish-red flakes. On the addition of diluted hydrochloric acid or sulfuric acid to its watery solutions the color becomes from reddish blue to violet, and after some time dark-blue flakes are separated. By concentrated sulfuric acid it is dissolved with greenish-blue color. On adding ice-water the sulfuric-acid solution assumes first a pure blue, then a reddish-blue color, and after some time a fine blue precipitate is separated. It produces on unmordanted cotton in an alkaline soap-bath violet-black shades.

When the fiber dyed with our new product is placed in a moderately-acidulated solution of sodium nitrite and subsequently in a weakly-alkaline solution of beta-naphthol, black shades result.

Our new dyestuff differs from the three dyestuffs which we have described in three separate patents—viz., United States Patent No. 498,759, dated June 6, 1893; No. 498,873, dated June 6, 1893, and No. 499,198, dated June 13, 1893, and of which the one results by combining equimolecular proportions of tetrazo-diphenyl salt, 1.8 amidonaphthol-beta-disulfo-acid and alpha-naphthol alpha-monosulfo-acid, while the other is obtained by the combination of equimolecular proportions of a tetrazo-orthoditolyl salt, 1.8 amido-naphthol beta-disulfo-acid and alpha-naphthol alpha-monosulfo-acid, and the third is produced by combining equimolecular proportions of a tetrazo-orthoditolyl salt, 1.8 amido-naphthol-beta-disulfo-acid and dihydroxynaphthalene. It likewise differs by its composition from the two products described by us in the applications filed December 18, 1891, Serial Nos. 415,515 and 415,516, and obtained from one molecular proportion of tetrazo-diphenyl or tetrazo-ditolyl salt and two molecular proportions of 1.8 amidonaphthol-beta-disulfo-acid.

Having thus described the nature of this invention and in what manner the same is to be carried out, we declare what we claim as new, and desire to secure by Letters Patent, is—

1. The process of producing a new coloring-matter by combining equimolecular proportions of a tetrazo-diphenyl salt with 1.8 amidonaphthol-beta-disulfo-acid and alpha-naphthylamin, substantially as described.

2. As a new product the coloring-matter having the formula

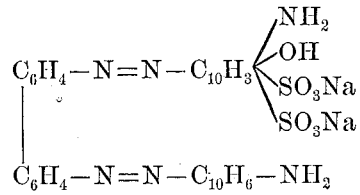

forming a brownish-black powder of metallic luster, soluble in water and alcohol with reddish-violet color, in ammonia with bright reddish violet, slightly redder than the aqueous solution; little soluble in sodium carbonate at ordinary temperature, more on heating, with a dull reddish-violet color, from which solution brownish-black flakes separate on cooling; scarcely soluble in soda-lye at ordinary temperature, more on heating, with a dull violet color; almost insoluble in dilute hydrochloric and sulfuric acid, even on heating; soluble in concentrated sulfuric acid, with greenish-blue color, assuming on addition of ice-water first, a pure blue, then a reddish-blue color, and finally separating a fine blue precipitate; dyeing unmordanted cotton in an alkaline bath violet-black shades which, after treatment with nitrous acid and subsequent combination with an alkaline solution of beta-naphthol, change into black, and having the qualities substantially as described.

In testimony whereof we have signed our names in the presence of two subscribing witnesses.

JOHANN BAMMANN.
MORITZ ULRICH.

Witnesses:
WM. ESSENWEIN,
RUDOLPH FRICKE.